United States Patent [19]

Beugin et al.

[11] 4,453,244
[45] Jun. 5, 1984

[54] RECORD PLAYER WITH SPRING-ASSISTED PICK-UP ARM RETURN

[75] Inventors: Michel Beugin, Flers; Jean-Pierre Marriere, La Chapelle Biche, both of France

[73] Assignee: U.S. Philips Corporation, New York, N.Y.

[21] Appl. No.: 316,616

[22] Filed: Oct. 30, 1981

[30] Foreign Application Priority Data

Mar. 20, 1981 [FR] France .................... 81 05630

[51] Int. Cl.³ ............................................. G11B 17/06
[52] U.S. Cl. ..................................... 369/225; 369/230; 369/245
[58] Field of Search ............... 369/225, 226, 227, 230, 369/245, 246

[56] References Cited

U.S. PATENT DOCUMENTS

| 828,598 | 8/1906 | Crabb | 369/225 |
| 1,332,722 | 3/1920 | Herbert | 369/226 |
| 4,183,538 | 1/1980 | Saito | 369/226 |

Primary Examiner—Steven L. Stephan
Attorney, Agent, or Firm—David R. Treacy

[57] ABSTRACT

A record player having a pick-up arm which is automatically moved to the rest position by a spring, the energy necessary for returning the arm being stored by the lowering device of the arm. A rotating cam which lowers the arm also moves one end of an over-center spring-loaded lever, whose far end is guided such that before the arm is fully lowered the lever passes a dead center position. Motion past dead center causes a pin on the lever to move into position in which subsequent lever return, due to the loading spring, rotates the arm to the rest position.

7 Claims, 3 Drawing Figures

RECORD PLAYER WITH SPRING-ASSISTED PICK-UP ARM RETURN

BACKGROUND OF THE INVENTION

The invention relates to a record player having a pick-up arm which is pivotable about a vertical axis and a horizontal axis, which arm can be moved from a rest position towards a record disk by a horizontal pivotal movement and can be lowered onto the record or lifted by vertical movement of an arm support which in turn is moved by means of a cam, the arm being lifted and returned to its rest position by energy stored in a spring which is tensioned when said arm is lowered onto the disk. Such a record player is known from German Patent application No. 1,572,418.

In this known record player the user actuates a control bar which tensions the return spring and which supports a plate carrying the arm-lowering/lifting cam and a pair of rods controlling the horizontal movements of the arm. This device has the drawback that it combines two operations, namely, the lifting and returning of the arm, although the user may wish to effect these operations separately. Indeed, it is convenient if the pick-up arm can be lifted while it remains above the record, either for subsequently continuing playing or for manually changing the position of the pick-up stylus. The mechanism known from the German Patent application No. 1,572,418 only allows the user to actuate the control bar, so that the lifted arm can occupy the rest position unless there is complete disengagement of the mechanism (manual operation of the arm).

SUMMARY OF THE INVENTION

In order to separate the two movements for lifting and returning the arm, the record player in accordance with the invention is characterized in that during lowering of the arm the cam which moves the arm support also actuates a toggle lever to which the arm-return spring is attached, the resulting over-center movement of the toggle lever causing a part of that lever to be positioned behind a finger on a member which is coupled to the arm for rotation therewith about the vertical axis. Thus, in comparison with German Patent application No. 1,572,418 the actuating sequence of the control element is reversed; by pushing against the control element, a lowering/lifting device actuates the element to which the spring is attached, instead of the other way round. Thus, when the toggle lever has been actuated the arm can be lifted and lowered again without causing return of the toggle lever or element, the cam no longer pushing the toggle lever, which is already in position. The invention specifically relates to "semi-automatic" record players in which the arm is manually positoned above the record.

The term "toggle lever" is to be understood herein to mean a lever which is pivotally movable in alterate directions through a central position and which is loaded by a spring in such a manner that when the lever is moved over-center, (that is, through the dead center position), in either direction, the spring biasses the lever in that direction when the lever has passed through the central position.

Preferably, in a record player according to the invention, the over-center movement of the lever also causes a part of that lever to be positioned behind a latch which is held in a latching position during playing of the record, which latch can be withdrawn from this position in order to permit the lifting and returning of the arm. The latch may, for example, be withdrawn by a separate control which can be operated by the user or by an end-of-record scanner which is responsive to the speed of movement of the arm radially over the record.

In order to enable the lever to engage behind the finger and the latch, it is preferably made to bypass these obstacles. To this end the path of the toggle lever is defined by the displacement of its pivot and by a pin on the lever which is forced to follow a closed guide path. Specifically, in the two end positions of the path of the toggle lever, the loaded condition of the lever, before the return of the arm, and its rest condition, after the return of the arm, are obtained by a sudden pivotal movement of the lever about a straight line on which the fixed point of attachment of the return spring, the point of attachment of that spring to the toggle lever and the pivotal axis of said lever are disposed. Such an arrangement specifically ensures that the actuating or toggle lever always follows its path in the same direction, one part being followed when the lever is pushed by the cam and the other part being followed when the spring returns the lever towards its rest position.

In a particular embodiment the cam which produces the vertical movements of the arm support comprises a body having substantially the shape of a sector of a circle, and comprises an upwardly curved cam track on the body and pivots about the vertical pivotal axis of the arm, the cam body being capable of producing, during lowering of the arm, a coaxial rotation of a finger carrying the pivot of the lever, and coversely, during lifting and returning of the arm, the lever, under the influence of the return spring, being capable of actuating the finger so as to press it against the cam body. Thus, the cam and the finger influence each other by pushing against each other without being connected to each other. It is desirable to slow down the return movement of the arm, because the spring lever tends to return it too abruptly to its rest position. Accordingly, during the lifting and return movement of the arm the rotation of the finger carrying the pivot of the lever is braked, for example, by a uni-directional brake.

An embodiment of a record player in accordance with the invention will be described in more detail with reference to the drawings.

DESCRIPTION OF THE PREFERRED EMBODIMENTS

Figure 1:
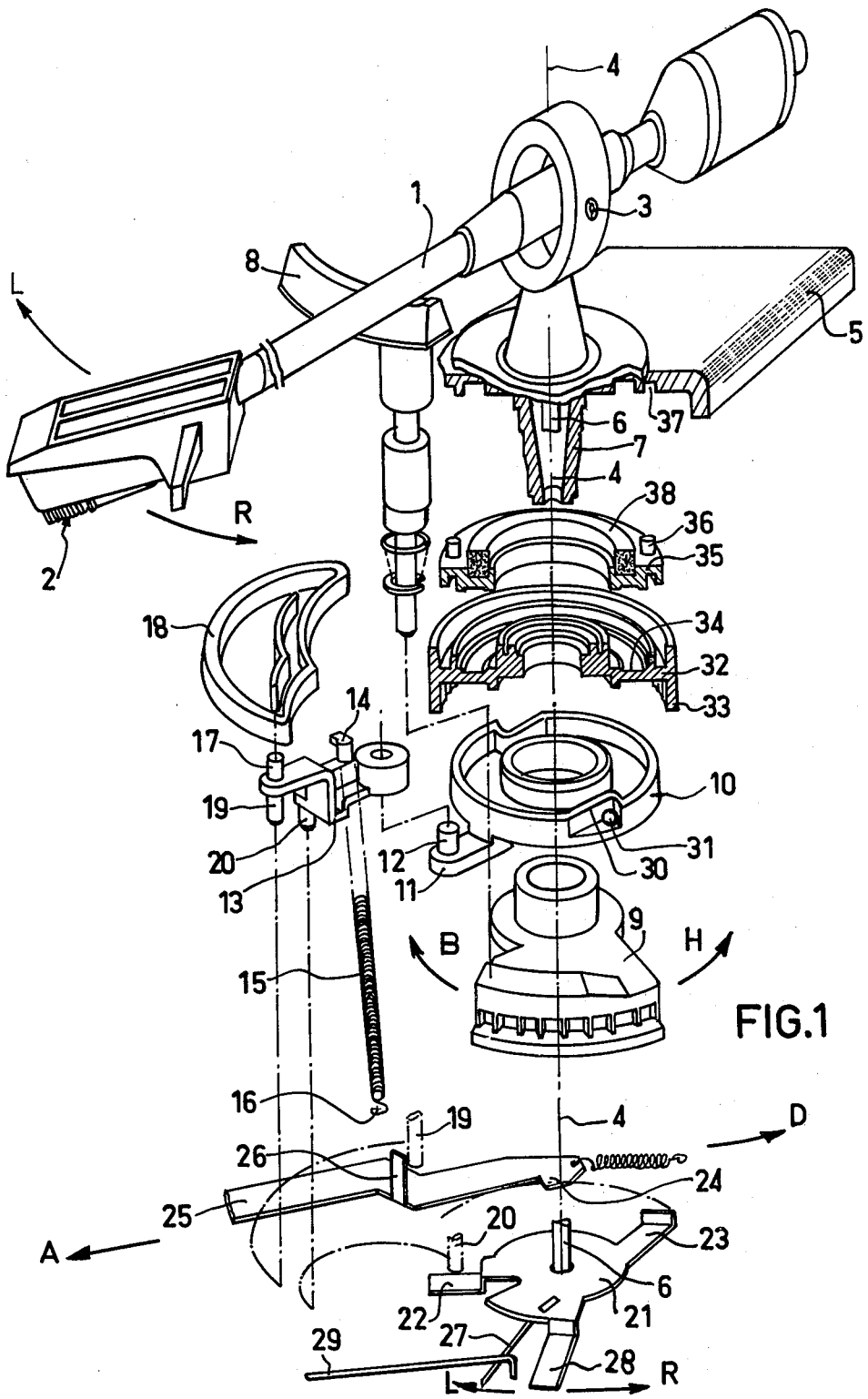
FIG. 1 is an exploded perspective view showing the relevant components of a record player in accordance with the invention.

FIG. 1 shows the mechanisms controlling the horizontal and vertical movements of the pick-up arm 1 of a record player in accordance with the invention. At its end the pick-up arm carries the pick-up head equipped with a stylus 2 which should be placed in the groove of a phonograph record situated on the turntable (not shown) of the record player.

The record player shown is of a semi-automatic type whose pick-up stylus is manually placed above the record and whose arm is subsequently lowered by the user. The arm is automatically lifted and returned to its rest position. For its vertical movements the arm 1 is pivoted about a horizontal axis 3 and for its horizontal movements about a vertical axis 4. The arm 1 and the turntable, not shown, of the record player are mounted on a substantially horizontal deck plate 5 through which a vertical spindle 6 extends, which spindle is connected to the arm 1 to pivot therewith about the axis 4. Underneath the deck plate 5 the spindle 6 extends through a hollow sleeve 7 around which the various elements to be described hereinafter are arranged. An arm support 8 also projects from the deck plate 5, which support is constituted by a horizontal portion, on which the arm 1 can rest and slide, and a base portion which extends through the deck plate and which can be moved vertically in order to lower and lift the support 8 and thus the arm 1.

The arm is brought to its playing position above the record by a horizontal rotation in the direction of the arrow L. The arm is returned to its rest position which position is defined by a slightly projecting stop on the support 8, by a horizontal rotation in the direction of the arrow R. The vertical movements of the base portion of the support may be damped in order to ensure a smooth set-down of the pick-up stylus in the record groove. For obtaining the vertical movement of the support 8 the base portion thereof bears on the upwardly curved track of a cam 9 comprising a body having substantially the shape of a sector of circle, which cam can rotate about the vertical axis 4. To this end the cam body is formed with teeth which engage with a pinion (not shown), which is connected to a control lever which is accessible to the user of the record player. When the cam 9 is rotated in the direction of the arrow H the support 8 is lifted to the upper position and when the cam is rotated in the direction of the arrow B the support is lowered and is separated from the arm 1 when the pick-up stylus rests in the groove of the record.

The elements by means of which the pick-up arm 1 is automatically lifted and returned will be described hereinafter. A ring 10 is centered on the cam 9, and can rotate freely about the hub of the cam. The ring 10 carries a substantially horizontal finger 11 which projects from the lower part of the ring 10 so as to cooperate laterally with the edge of the sector-shaped body of the cam 9. The finger 11 carries a vertical upwardly directed pivot 12, on which a toggle lever 13 is mounted so as to be rotatable, which lever serves for setting the automatic pick-up arm return device. One end of a spiral arm-return spring 15 is attached to a point 14 on the toggle lever 13. The other end of the spring 15 is attached to a fixed point 16, for example, underneath the deck plate 5. The toggle lever 13 also carries a vertical upwardly directed guide pin 17 which serves to follow a fixed, for example, creascent-shaped guide wall 18, formed underneath the deck plate 5. The toggle lever 13 also comprises a vertical downwardly directed latching pin 19, which is disposed coaxially with the guide pin 17 in the present example. Finally, the toggle lever 13 comprises a finger 20 which serves to push the pick-up arm towards its rest position.

The spindle 6, which is coupled to the arm 1 for rotation therewith about the axis 4, is connected to a member 21 having a first finger 22; second, flexibler finger 27; third finger 28; and arm 23 all extending geneally radially from the axis 4, with appropriate axial offsets to engage other parts of the mechanism. The first finger 22 which can be pushed in the direction of the arrow R by the finger 20 of the toggle lever 13. The arm 23 can engage a nose 24 on a control bar 25 when the member 21 rotates in the direction L, in order to effect a translation of said bar in the direction of the arrow D. At its end which is not shown the bar 25 is connected to an electrical switch arranged in series with the power supply of the electric motor of the record player. When the bar 25 is drawn in the direction D the contact of the switch is closed, the motor is energized, and the turntable of the record player starts to rotate. The bar 25 also comprises a finger 26 which constitutes a latch, which finger is formed by, for example, a metal strip bent upwards from the bar. When the bar 25 is drawn in the direction of D (starting of the record player), the latch 26 occupies a position for blocking the movement of the latching pin 19 of the toggle lever 13, thereby retaining the toggle lever. In order to stop the record player the bar 25 is actuated in the reverse sense in the direction of the arrow A. In a conventional manner, a ratchet device is used having a retractable pawl and an end-of-record scanner (not shown) which moves the bar in the direction A. Such a scanner is gradually pushed by a scanner rod 29 which itself is pushed by the third finger 28 on the member 21, which is connected to the pick-up arm by the spindle 6. When the groove of the record is being scanned, the arm 1 and the member 21 rotate very slowly in the direction L and very slowly advance the scanning rod 29, which movement is too slow to trip the ratchet device. At the end of the record the pitch of the lead-out groove suddenly increases substantially, the speed with which the arm 1 and the member 21 are pivoted also increases and the scanning rod 29 trips the ratchet device, which draws the control bar 25 in the direction A to stop the record player. The flexible finger 27 on the member 21 serves to position the scanning rod 29 when a record-playing cycle is started.

In order to slow down the rotation of the ring 10 in the direction H under the influence of the arm-return spring 15 which acts on the lever 13, the ring 10 is connected to the deck plate 5 through a unidirectional brake, of which an exaple is described hereinafter. The ring 10 has two peripheral recesses 30 each containing a ball 31. Arranged on the ring is a cover 32 which can rotate freely on the ring 10. A lower rim 33 of the cover 32 is internally axially grooved at the side facing the balls 31. The angular shape of the recesses 30 enables the balls 31 to be urged against the grooves of the rim 33 when the ring 10 is driven in the direction H, so that the cover 32 and the ring 10 are rotated together in this direction, and enables the balls 31 to recede when the ring is driven in the direction B, so that the cover 32 is not driven with the ring in that direction B. In its horizontal upper surface the cover 32 has a circular groove 34 which contains silicone grease. A ring 35 is pressed towards the groove 34, which ring is prevented from rotating by pins 36 which engage in bores 37 in the deck plate and which are pressed downward elasticaly, for example by an elastic foam ring 38 arranged against the underside of the deck 5. When the ring 10 is moved in the direction H by the toggle lever 13 through the finger 11, it drives the cover 32 through the balls 31. The friction of the cover against the ring 35, because of the interposed grease, brakes the movement. In order to prevent the grease from being extruded into the mechanism, the cover 32 and the ring 35 are formed with a system of interengaging peripheral ridges and grooves which constitute traps.

Figure 2:
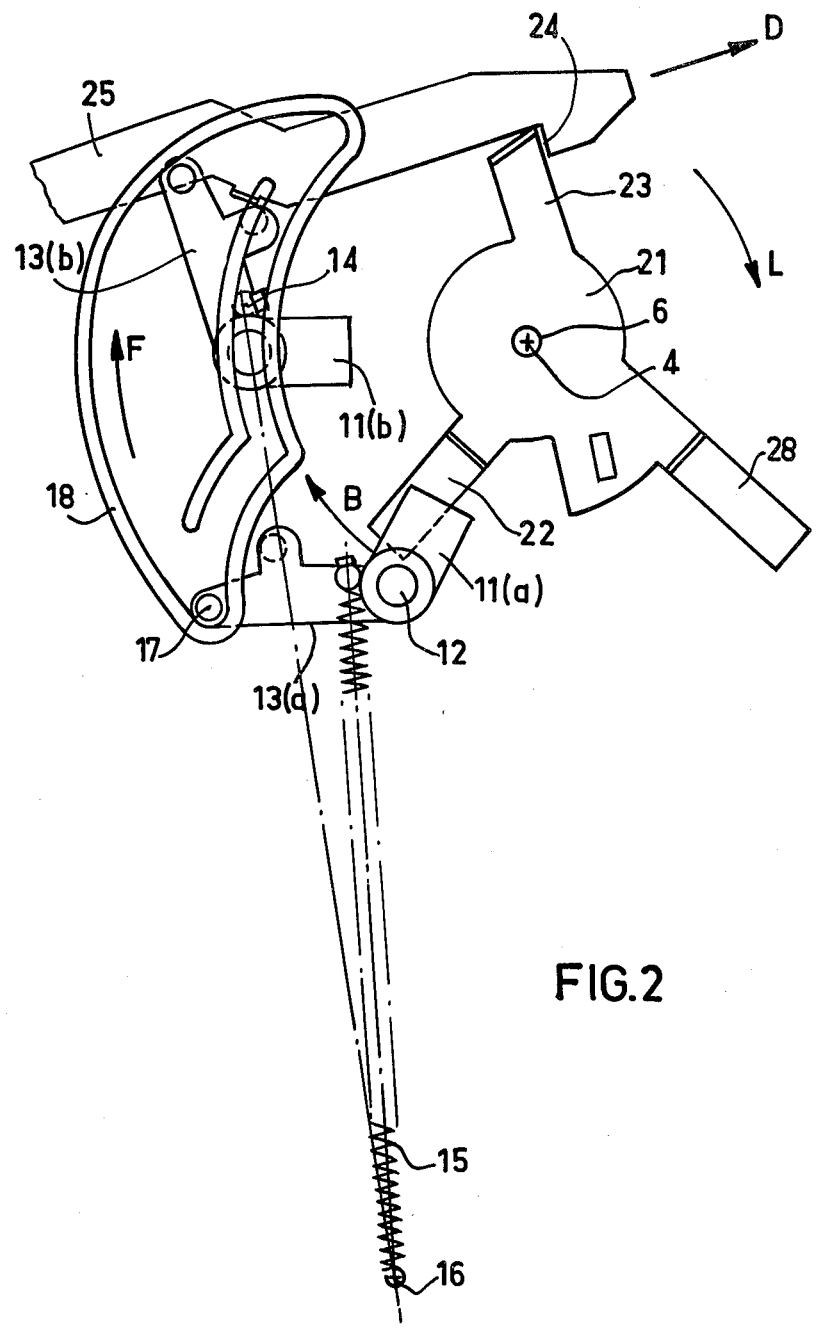
FIGS. 2 and 3 are diagrammatic plan views illustrating the movements of the toggle lever of the record player according to FIG. 1.
Figure 3:
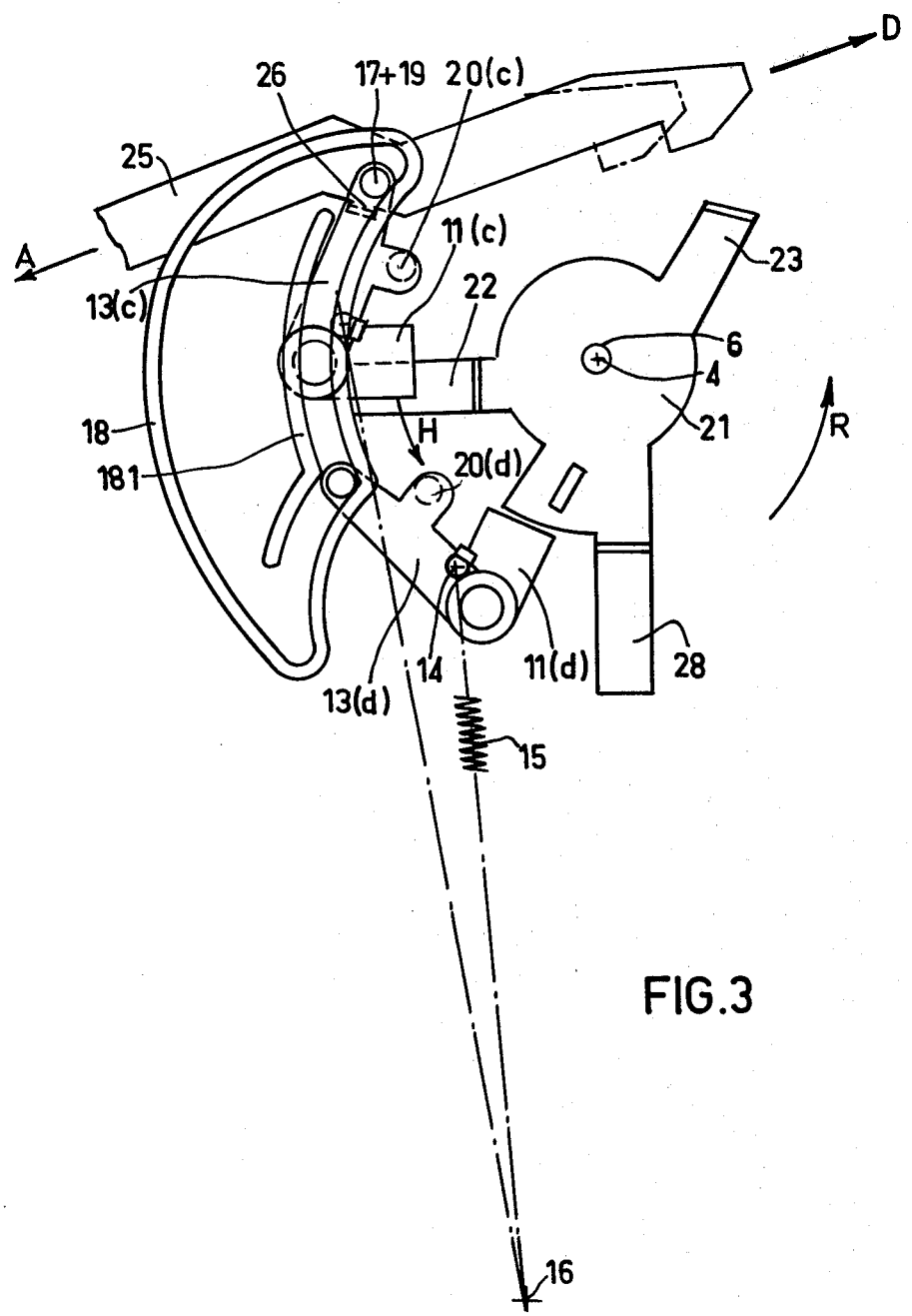

The operation of the mechanisms described in the foregoing will now be described in more detail with reference to FIGS. 2 and 3 which show in plan view the successive positions of the various elements of these mechanisms.

The starting condition is that in which the pick-up arm is in the raised rest position, in which it is positioned on its support 8 at the right-hand end thereof (FIG. 1). The member 21 occupies the position shown in FIG. 2. The user slides the pick-up arm on its support towards the record to position the arm for playing a record (direction L). Simultaneously the spindle 6 causes the member 21 to rotate in the same direction L. The arm 23 of the member 21 then moves the control bar 25 in the direction D, by pressing against the nose 24, to start the motor of the record player. The cam 9 still occupies the position in which the support 8 is raised. The finger 11 occupies position 11 (a) shown in FIG. 2. The toggle lever occupies position 13 (a) in which it is maintained by the tension of the spring 15. The pin 17, which engages the fixed guide path 18, together with the pivot 12 defines this toggle lever "rest" position 13 (a) at one of the ends of the crescent-shaped guide path.

The pick-up arm 1 is then lowered onto the record. For this purpose the user moves the cam 9 in the direction B. The arm support 8, whose base portion bears on the cam, is lowered and is separated from the arm when the pick-up stylus reaches the record. During its movement (direction B) the cam 9 pushes against the finger 11 on which the lever 13 is pivoted. The pin 17 of that lever follows the guide path defined by the wall 18 in the direction of the arrow F. The different curvature of the arcuate path of the pivot 12 and of the path defined by the guide wall 18 causes the lever to pivot in the clockwise direction relative to the finger 11. When this finger reaches position 11 (b) the points of attachment 14 and 16 of the spring 15 are in line with the axis of the pivot 12 of the lever, which is in position 13 (b). When the finger 11 is pushed (direction B) beyond the position 11 (b), the lever 13 suddenly flips past dead center under the influence of the spring 15, the guide wall allowing the lever to move freely through approximately 25° in the clockwise direction. The lever is then in position 13 (c) shown in FIG. 3. As a result of the over-center movement the pin 19 (disposed underneath the pin 17) is positioned behind the latch 26 of the control bar 25, which latch has been brought into the latched position during the movement of the bar (direction D) upon starting of the record player.

At this end of its path the lever 13 is then immobilized in the "loaded" position, the spring 15 being tensioned. The pick-up stylus is placed on the record. It can be lifted and lowered again by rotating the cam 9 in the directions H and B. This does not affect the latching of the toggle lever 13.

Automatically at the end of the record, or by a manual displacement of the pick-up arm towards the center of the record, the member 21 (FIG. 1) pushes against the scanning rod 29, which trips the stop device of the record player and specifically pulls the control bar 25 in the direction A. The latch 26 is moved away from the pin 19 of the toggle lever 13. The spring 15 pulls the lever 13 and the finger 11 from positions 13 (c), 11 (c) to position 13 (d), 11 (d) shown in FIG. 3. Rotating in the direction H the finger 11 immediately pushes against the cam 9, thereby causing the pick-up arm to be lifted if it is in the lowered position. Subsequently, the finger 20 of the lever pushes the finger 22 of the member 21 in the direction R and thereby moves the pick-up arm to its rest position. During this movement from 11 (c) to 11 (d) the axis of the pivot 12 again comes in line with the points of attachment 14 and 16 of the spring. However, over-center movements of the lever 13 is delayed by a second wall 181 of the guide wall assembly in order to retain the finger 20 in engagement with the finger 22 of the member 21 until the "rest" position of the pick-up arm is reached (situation 20 (d) of the finger). The toggle lever is now free to pivot in the clockwise direction in order to resume its position 13 (a) in FIG. 2. During the rotation from 11 (c) to 11 (d) the finger 11 and its ring 10 drive the cover 32 through the balls 31, the movement of that cover being braked. Thus, the return movement of the arm is also braked.

The shape and function of the guide wall 18 will now be described in more detail. The wall 18 should guide one end (pin 17) of the toggle lever 13, whose other end is articulated to the pivot 12, which itself rotates about the axis 4. The guide wall is substantially crescent-shaped, the concave side being directed towards the spindle 6. The path has "loading" and "return" portions which are arcs of circles whose center of curvature lie on the axis 4. Between path two portions the lever 13 pivots about the common axis of its pivot and the spring 15. The two portions are joined at their ends by two concave arcuate portions, permitting the lever to pivot freely and having a radius substantially equal to the length of the lever 13. During loading the two pivotal movements allow the pin 19 to engage behind the latch 26 and the finger 20 behind the finger tab 22 of the member 21 and, after the return of the pick-up arm, they allow the finger 20 to move away from the finger 22. After each of these pivotal movements the lever occupies either of two stable positions "loaded" or "rest" respectively. The energy necessary for loading is provided by the arm-lowering device (cam 9), which energy is stored by the spring 15, which is released for the return movement of the pick-up arm.

What is claimed is:

1. A record player having a pick-up arm which is pivotable about a vertical axis and a horizontal axis; a vertically movable arm support; and means for moving the arm from a rest position towards and away from a record by horizontal pivotal movement, and lowering onto the record or lifting by vertical movement of said arm support, said means including a cam for lifting and lowering the arm support; a member coupled to the pick-up arm for rotation therewith about said vertical axis, comprising at least one finger arranged such that movement of the finger rotates the member about the vertical axis; and an arm-return spring which is tensioned when the arm is lowered onto the record, energy stored in the spring being used to lift and return the arm to its rest position, characterized in that said means comprises:
a toggle lever to which the arm-return spring is attached, tension force of said spring being transmitted through said lever for lifting and returning the arm; said toggle lever being pivotable about an axis, disposed with respect to said spring such that a lever dead-center position is defined, and
means for moving the toggle lever in response to movement of the cam during lowering of the arm onto a record, arranged such that the toggle lever is moved from a rest position in which the lever is free of engagement with said finger past dead center, and the spring force then rotates the lever to a loaded position in which a part of said lever is disposed in a position to engage said finger thereby enabling a further movement of the lever to rotate the member and return the arm toward the rest position.

2. A record player as claimed in claim 1, characterized in that the player further comprises a latch, means for holding the latch in a latching position during playing of a record, and withdrawing the latch from that position to permit lifting and return of the arm, said toggle lever further comprising a catch part arranged to engage said latch upon rotation of the lever past dead center to the loaded position while the latch is in the latching position, upon withdrawal of the latch the lever then being free to move in response to the spring tension force.

3. A record player as claimed in claim 2, characterized in that said means for moving the lever further comprises a guide wall defining a closed guide path; and said lever includes a pin, movement of the toggle lever being defined by displacement of the lever pivot axis and by engagement by said pin on said lever with said guide wall.

4. A record player as claimed in claim 1, characterized in that said means for moving the lever further comprises a guide wall defining a closed guide path; and said lever includes a pin, movement of the toggle lever being defined by displacement of the lever pivot axis and by engagement by said pin on said lever with said guide wall.

5. A record player as claimed in claim 1, 2, 3, or 4, characterized in that the toggle lever pivot axis is moved along a path about said vertical axis between a loaded end position, occupied while the pick-up arm is in a playing position, and a rest end position after return of the pick-up arm, said loaded and rest lever positions being reached by sudden pivotal movement of the lever about the pivot axis when a fixed point of attachment of the arm-return spring, a point of attachment of said spring to the toggle lever, and the lever pivot axis are aligned along a straight line.

6. A record player as claimed in claim 5, characterized in that said cam comprises a body arranged for rotation about said vertical axis and having an upwardly curved cam track for raising said arm support, and said means for moving the lever includes a ring finger which carries a toggle lever pivot and defines said pivot axis, arranged for coaxial rotation with said cam during lowering of the arm; said ring finger and cam being further arranged such that during lifting and returning of the arm, movement of said toggle lever under the influence of the return spring presses the ring finger against the cam body to rotate the cam body.

7. A record player as claimed in claim 6, characterized in that said means for moving the arm further includes a unidirectional brake for braking the rotation of said ring finger during the lifting and return movements of the pick-up arm.

* * * * *